Jan. 13, 1970  G. V. WOODLING  3,489,420

SHAFT SEAL ASSEMBLY

Filed March 4, 1968

INVENTOR.
GEORGE V. WOODLING
BY
Woodling, Krost, Granger and Rust.
attys.

United States Patent Office 3,489,420
Patented Jan. 13, 1970

3,489,420
SHAFT SEAL ASSEMBLY
George V. Woodling, 22077 West Lake Road,
Rocky River, Ohio 44116
Filed Mar. 4, 1968, Ser. No. 710,053
Int. Cl. F16j *15/32, 15/54*
U.S. Cl. 277—37                                    6 Claims

ABSTRACT OF THE DISCLOSURE

Shaft seal assembly means having a sealing member disposed to sealingly engage a shaft, wherein said sealing member is insertable end-wise within an annular cushioning member held inside of a retaining ring. Interlocking surfaces are provided between the outside of the sealing member and the inside of the annular cushioning member to provide a fluid seal therebetween and hold the sealing member in place after it is once inserted within the annular cushioning member. The annular cushioning member is responsive to fluid pressure and exerts an inwardly directed compressive force against the sealing member to render the sealing action between the sealing member and the shaft secondarily responsive to fluid pressure.

---

In the operation of a reciprocating shaft, the fluid seal, upon each reciprocation, is lubricated by a liquid film on the shaft which reduces friction and heat. However, in the operation of a rotating shaft, the fluid seal operates only in one place and soon heats-up for lack of lubrication. Thus, heat becomes the real problem. Friction between the rotating shaft and the seal creates heat, and the heat, in turn, creates more friction. The process becomes self-perpetuating until the seal is destroyed.

A rotating shaft seal which sealingly engages a shaft with an excessive amount of contact pressure to thereby seek a perfect seal is in trouble, because the increased friction produced by the excessive contact pressure simply results in more self-perpetuating heat.

The present disclosure features a floating-cushioning fluid seal whereby the sealing action is secondarily responsive to fluid pressure and thus minimizes the phenomenon, known as the Gow-Joule effect.

The fluid seal assembly comprises a continuous annular metal retaining ring, a continuous annular cushioning member mounted in the ring, and a sealing member sealingly engaging the shaft mounted within the cushioning member. The cushioning member is composed of a rubber-like material having first and second portions integrally joined together and defining where they are joined together an annular junction. The first portion of the cushioning member extends outwardly from said annular junction and is sealingly secured to said retaining ring. The second portion of said cushioning member extends axially from said annular junction and defines a hollow cantilever extension having inside and outside surfaces. The sealing member is made of a low-friction, resistingly yieldable plastic material having an external surface and an internal surface. The external surface of the plastic sealing member fits within and is sealingly engaged by the inside surface of the cantilever extension. As will be seen, the cantilever extension functions as a boot which floatingly, and cushioningly supports the plasitc sealing member and accommodates for axial eccentricity. The internal surface of the sealing member sealingly engages the shaft. The outside surface of the cantilever extension is responsive to fluid pressure and causes the cantilever extension to exert an axially distributed, inwardly directed compressive force against the sealing member to render the sealing action between the sealing member and the shaft secondarily responsive to fluid pressure. The cantilever extension may have spring means to urge the cantilever extension against the sealing member for low pressure operation. The internal sealing surface of the sealing member may be tapered whereby under conditions of low fluid pressures only a short axial portion of the internal sealing surface engages the shaft and whereby under conditions of high fluid pressures a longer axial portion of the internal sealing surface engages the shaft.

The floating and cushioning action not only prolongs the life of the seal, but also enables the seal, since the Gow-Joule effect is minimized, to withstand higher fluid pressures and higher shaft speeds.

My invention relates in general to shaft fluid seals and more particularly to rotating shaft seals.

Although my invention is particularly useful for rotating shaft seals, it is not necessarily limited thereto, because it may also be used on reciprocating shafts.

An object of my invention is the provision of a floating-cushioning shaft seal.

Another object of my invention is the provision of a shaft sealing member, made of low-friction resistingly yieldable plastic material, floatingly and cushioningly mounted about the shaft by a hollow, yieldable cantilever extension.

Another object of my invention is the provision of mounting the plastic seal member within a hollow, yieldable cantilever extension which functions as a boot.

Another object of my invention is the provision of a shaft seal which accommodates for axial eccentricity.

Another object of my invention is the provision of a shaft seal having a sealing action secondarily responsive to fluid pressure.

Another object of my invention is the provision of a shaft seal having a sealing surface taperingly engaging the shaft.

Another object of my invention is to provide for distributing the compressive contact force, which urges the plastic sealing member against the shaft, over an axially extending area.

Another object of my invention is the provision of a shaft seal having a sealing action which minimizes the phenomenon known as the Gow-Joule effect.

Another object of my invention is the provision of a shaft seal which provides a cushioning compressive force for urging the plastic sealing member against the shaft.

Another object of my invention is the provision of a shaft seal which avoids the application of a solid, localized compressive force to urge the plastic sealing member against the shaft.

Other objects and a fuller understanding of this invention may be had by referring to the following description and claims, taken in conjunction with the accompanying drawings, in which:

Figure 2:
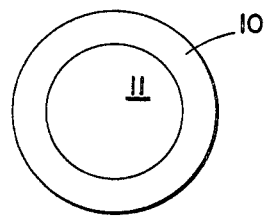
FIGURE 2 is an end view of FIGURE 1.
Figure 1:
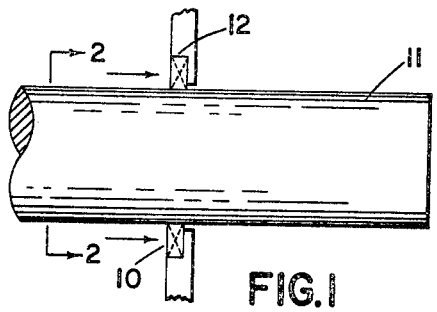
FIGURE 1 is a view, diagrammatically illustrating the position in which my shaft seal assembly is mounted between a shaft and a cylindrical surface (counter-bore) confronting and spaced outwardly from the shaft.

In FIGURES 1 and 2, my shaft seal (diagrammatically illustrated) is identified by the reefrence character 10, and is disposed to be mounted between a shaft 11 and a counter-bore 12 provided in a flange or wall of a fluid pressure device through which the shaft extends. The shaft seal is responsive to fluid, under pressure in the fluid pressure device, and the direction at which the pressure is applied against the shaft seal is indicated by the arrows in FIGURE 1.

Figure 3:
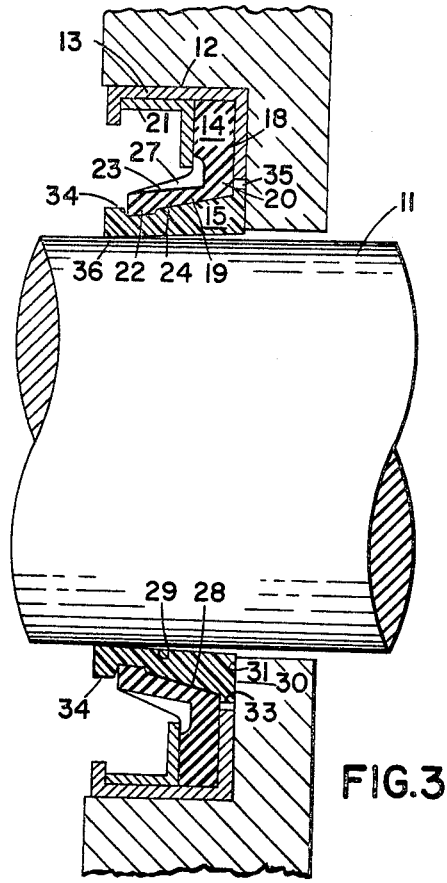
FIGURE 3 is an enlarged (drawn to substantially three-times scale for a one inch shaft) diametrical cross-sectional view of a shaft seal embodying the features of my invention.

As shown in FIGURE 3, drawn to substantially three-times scale for a one inch shaft, my shaft seal assembly comprises a continuous annular metal retaining ring 13, a continuous annular cushioning member 14 mounted in the ring, and a sealing member 15 sealingly engaging the shaft mounted within the cushioning member. The metal retainer ring 13 may be sealingly pressed into the counterbore 12. The cushioning member 14 is preferably composed of a rubber-like material, such as "neoprene" or the like, and is commercially available in various formulations. The cushioning member 14 has first and second portions 18 and 19 integrally joined together and defines where they are joined together an annular juncture 20. The first portion 18 of the cushioning member 14 extends outwardly from the annular juncture 20 and is sealing secured to the retaining ring 13 by an L-shaped metal clamping member 21. The second portion 19 of the cushioning member 14 extends axially from the annular juncture 20 and defines a hollow, yieldable cantilever extension 22 having outside and inside surfaces 23 and 24. A series of circumferentially disposed spring fingers 27, having their base anchored under the L-shaped clamping member, are disposed to have their free ends to resiliently support the hollow cantilever extension 22 for low pressure operation.

The sealing member 15 is preferably made of a low-friction, resistingly yieldable plastic material, such as "Teflon," "nylon," "Delrin," "Lexan," "Kel-F," or the like, and are commercially available in various formulations under the tradenames mentioned. The sealing member 15 has an external surface 28 and an internal surface 29. The external surface 28 is disposed to fit within and is sealingly engaged by the inside surface 24 of the cantilever extension 22 which functions as a boot. The right-hand end of the plastic sealing member 15 is provided with an annular shoulder 33 and the left-hand end with an annular shoulder 34. In mounting the plastic sealing member, it may be pushed into the hollow, yieldable cantilever extension from right-to-left, the extension swelling as the plastic sealing member is pushed therein. After the plastic sealing member is once pushed into the cantilever extension, it is held there by the annular shoulders 33 and 34, which make an interlocking engagement therewith. The external surface 28 of the plastic sealing member 15 between the annular shoulders 33 and 34 is contoured to match the inside surface 24 of the cantilever extension 22 of the cushioning member 14 when the latter is in a free state. It is the presence of the shoulder 34 which swells the cantilever extension during the mounting of the plastic sealing member 15 therein. Preferably, there is a minimum of tensional stress on the cantilever extension when the plastic sealing member 15 is mounted therein.

The internal surface 29 of the sealing member sealingly engages the shaft. The outside surface 23 of the cantilever extension 22 is responsive to fluid pressure and causes the cantilever extension 22 to exert an inwardly directed compressive force against the sealing member 15 to render the sealing action between the sealing member and the shaft secondarily responsive to fluid pressure. The spring fingers 27 urge the cantilever extension 22 against the sealing member 15 for low pressure operation. The internal sealing surface 29 of the sealing member may be tapered, whereby under conditions of low fluid pressures only a short axial portion of the tapered surface engages the shaft and whereby under conditions of high fluid pressures a longer axial portion of the tapered surface engages the shaft. The tapered annular internal sealing surface 29 has a small end engaging the shaft substantially at the pressure entrance end 36 of said plastic sealing member, which is the left-hand end in FIGURE 3 and being the end against which fluid pressure is applied.

The compressive force, set up in the cantilever extension in response to fluid pressure, is widely distributed over an axially extending area and thereby avoids the application of a solid, localized compressive force against the plastic sealing member. As a result, the plastic sealing member 15, having a minimum of distributed friction along the shaft, is disposed to generate only a minimum amount of heat. Thus, the cantilever extension 22 gives improved performance over that of an O-ring, if the latter were used like a garter, under high tension, to squeeze the plastic sealing member agains the shaft. Most elastomers, such as O-rings, when heated in a stretched or stressed (garter-like) condition will contract. This contraction (shrinkage) is damaging because it results in a tendency for the O-ring to squeeze all the harder against the plastic sealing member, which self-perpetuates more heat. This phenomenon, known as the Gow-Joule effect, occurs only if the rubber is under tensile (gareter-like) stress. Thus, an O-ring should not be installed in a gland which holds it in more than a minimum of tensional stress. In my shaft seal assembly, it is apparent that the cantilever extension, which functions as a boot, is substantially free from a solid, localized tensional stress and there is little opportunity for the Gow-Joule effect to occur. Thus, in my sealing assembly, the generated heat which may happen to be occasioned by the by the distributed friction is held to a low value because the heating process is not self-perpetuating, as would be the case with an O-ring exerting a solid, localized tensional stress against the plastic sealing member.

The plastic sealing member 15 is normally constrained from turning or rotating within the hollow cantilever extension. It is further constrained from rotating when subjected to fluid pressure because the force of the fluid pressure forces the end surface 30 of the sealing member 15 firmly against the terminating wall 31 of the counterbore 12. The forceable engagement between the end 30 and the terminating wall 31 of the counterbore resists any tendency of rotation. The cantilever extension 22, because of its cushioning freedom, allows the sealing member 15 to seek its own axial alignment with the axis of the shaft. This freedom thus avoids any tendency for the shaft to bear more heavily on one side of the seal than on the other side due to axial eccentricity. An annular clearance space 35 is provided between the annular shoulder 33 and the side of the retainer ring 13 to allow for accommodation of axial eccentricity.

Figure 4:
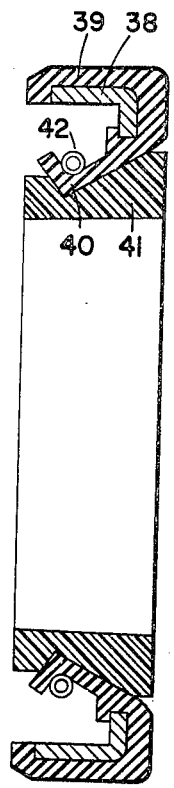
FIGURE 4 is an enlarged, diametrical cross-sectional view of a modified shaft seal embodying the features of my invention.

FIGURE 4 shows a modification of my shaft seal assembly, in that the annular retaining member 38 has a bonded case of rubber-like material 39 integrally joined to a hollow cantilever extension 40. The bonded case enables the retainer ring 39 to be easily mounted into the counter-bore to provide a fluid pressure sealing engagement therewith. The plastic sealing member 41 may be pushed into the hollow, cantilever extension 40 from right-to-left, the extension swelling as the plastic sealing member is pushed therethrough. The V-shaped engagement between the plastic sealing member 41 and the cantilever extension 40 functions as an interlocking engagement to hold the plastic sealing member 41 in place. The cantilever extension 40 in FIGURE 4 may have a garter spring 42 to urge the cantilever extension 40 against the plastic sealing member 41 for low pressure operation.

The operation of the shaft seal in FIGURE 4 is substantially the same as that in FIGURE 3. It is to be observed that in both figures, the plastic sealing member has a tapering, diverging external surface whereby the wall thickness thereof becomes increasingly thicker toward the right-hand end thereof to support the cantilever extension. The construction enables the shaft seal to withstand high fluid pressures.

Although this invention has been described in its preferred form with a certain degree of particularity, it is understood that the present disclosure of the preferred form has been made only by way of example and that numerous changes in the details of construction and the combination and arrangement of parts may be restored to without departing from the spirit and scope of the invention as hereinafter claimed.

What is claimed is:

1. Shaft seal assembly means comprising a continuous annular retaining ring having laternally extending inside and outside surface portions, said outside surface portion defining a first plane, a continuous annular cushioning member of yieldable rubber-like material having first and second portions integrally joined together and defining an annular junction therebetween, said first portion of said cushion member extending outwardly from said annular junction and being sealingly secured to said laterally extending inside surface portion of said retaining ring, said second portion of said cushioning member extending axially from said annular junction and defining a hollow cantilever extension having inside and outside surfaces, a continuous annular sealing member of low-friction, resistingly yieldable plastic material having an external surface and an internal surface, said external surface of said sealing member fitting within and being sealingly engaged by said inside surface of said cantilever extension, said external surface of said annular sealing member having first and second laterally extending opposed wall means, said hollow cantilever extension having third and fourth laterally extending opposed wall means with said third wall means facing said first wall means and with said fourth wall means facing said second wall means, said facing wall means opposing relative axial movement between said annular sealing member and said hollow centilever extension, said annular sealing member having an axial length greater than that of said hollow cantilever extension and having a laterally extending end surface disposed in substantially said first plane, said internal surface of said sealing member sealingly engaging said shaft, said outside surface of said cantilever extension being responsive to fluid pressure and causing said cantilever extension to exert an inwardly directed compressive force against said sealing member to render the sealing action between the sealing member and the shaft secondarily responsive to fluid pressure, said yieldable cushioning member and said sealing member respectively having a yieldable terminal end portion and a sealing terminal end portion, said yieldable terminal end portion defining an opening, said sealing terminal end portion having a terminating annular shoulder and a stepped annular surface next adjacent thereto defining a stepped edge wall therebetween and constituting said first wall means, said terminating annular shoulder being larger than said opening and being insertable therethrough and extending axially therebeyond with said yieldable terminal end portion fitting around said stepped annular surface, said sealing member defining with said annular retaining ring an annular clearance space and being supported in generally a radial direction solely by said yieldable cushioning member to allow for accommodation of axial eccentricity.

2. The structure of claim 1, wherein said cantilever extension has spring means to urge said cantilever extension inwardly against said sealing member.

3. The structure of claim 1, wherein said retaining member has a bonded case of yieldable, rubber-like material to which said first portion of said cushioning member is integrally joined.

4. The structure of claim 1, wherein said internal surface of said plastic sealing member comprises a tapering annular surface, said tapering annular surface having a small end engaging said shaft substantially at the pressure entrance end of said plastic sealing member.

5. The structure of claim 1, wherein said external surface of said plastic sealing member has a divergingly tapered portion to support said cantilever extension.

6. The structure of claim 1, wherein said plastic material consists of "Teflon," "nylon," "Delrin," "Lexan" and "Kel-F."

References Cited

UNITED STATES PATENTS

| 2,273,962 | 2/1942 | Hubbard | 277—35 X |
| 2,736,585 | 2/1956 | Riesing | 277—153 |
| 2,750,212 | 6/1956 | Skinner | 277—153 |
| 2,804,324 | 8/1957 | Stallings | 277—153 |
| 2,804,325 | 8/1957 | Riesing | 277—153 |
| 3,072,413 | 1/1963 | Parks | 277—153 X |
| 3,135,518 | 6/1964 | Carson et al. | 277—37 |

JAMES K. CHI, Primary Examiner

U.S. Cl. X.R.

277—153